US007680204B2

(12) United States Patent
Champion

(10) Patent No.: US 7,680,204 B2
(45) Date of Patent: Mar. 16, 2010

(54) METHOD AND SYSTEM OF CONVOLUTIVE CODING FOR THE TRANSMISSION OF SPACE-TIME BLOCK CODES ACCORDING TO THE TECHNIQUE TERMED GOLDEN CODE

(75) Inventor: David Champion, Paris (FR)

(73) Assignee: Comsis, Paris (FR)

( * ) Notice: Subject to any disclaimer, the term of this patent is extended or adjusted under 35 U.S.C. 154(b) by 892 days.

(21) Appl. No.: 11/418,014

(22) Filed: May 4, 2006

(65) Prior Publication Data

US 2006/0274848 A1 Dec. 7, 2006

(30) Foreign Application Priority Data

Jun. 3, 2005 (FR) .................................. 05 05662

(51) Int. Cl.
*H04L 1/02* (2006.01)
(52) U.S. Cl. .................... 375/267; 375/299; 375/347
(58) Field of Classification Search ................. 375/267, 375/265, 299, 347
See application file for complete search history.

(56) References Cited

U.S. PATENT DOCUMENTS

2004/0057530 A1* 3/2004 Tarokh et al. ................ 375/267

2005/0078761 A1* 4/2005 Hottinen et al. ............. 375/267

OTHER PUBLICATIONS

Belfiore, J-C et al.: "The Golden Code: A 2x2 Full-Rate Space-Time Code with Non-Vanishing Determinants" Information Theory, 2004. ISIT 2004. Proceedings. International Symposium in Chicago, Illinois, USA Jun. 27-Jul. 2, 2004, Piscataway, NJ, USA, IEEE, Jun. 27, 2004, p. 310.

Dayal, P. et al. Institute of Electrical and Electronics Engineers: "An Optimal Two Transmit Antenna Space-Time Code and its Stacked Extensions" Conference Record of the 37th. Asilomar Conference on Signals, Systems & Computers. Pacific Grove, CA, Nov. 9-12, 2003, Asilomar Conference on Signals, Systems and Computers, New York, NY: IEEE, US, vol. 1 of 2 CONF. 37, Nov. 9, 2003, pp. 987-991.

* cited by examiner

*Primary Examiner*—Emmanuel Bayard
(74) *Attorney, Agent, or Firm*—Greer, Burns & Crain, Ltd.

(57) ABSTRACT

A method is provided for convolutive coding for the transmission of space-time block codes according to the technique termed Golden Code, in a wireless communication network comprising at least a plurality of transmit antennas. The Golden Code coding is associated with a trellis coded modulation, and the necessary partitioning to the trellis is produced such that, for each partitioning step, a set $\Gamma_\infty$ is multiplied by at least one element $\beta$ from the set $B_k$ (k>1) of elements of Az such that:

$$B_k = \{X \in Az \text{ and } |Det(X)|^2 = 2^k\},$$

the set $\Gamma_\infty$, termed "infinite Golden Code", being a principal ideal of the ring Az as defined by the Golden Code technique.

9 Claims, 3 Drawing Sheets

0, 16, 32, 48, 64, 80, 96, 112, 128, 144, 160, 176, 192, 208, 224, 240
8, 24, 40, 56, 72, 88, 104, 120, 136, 152, 168, 184, 200, 216, 232, 248
16, 0, 48, 32, 80, 64, 112, 96, 144, 128, 176, 160, 208, 192, 240, 224
24, 8, 56, 40, 88, 72, 120, 104, 152, 136, 184, 268, 216, 200, 248, 232
32, 48, 0, 16, 96, 112, 64, 80, 160, 176, 128, 144, 224, 240, 192, 208
40, 56, 8, 24, 104, 120, 72, 88, 168, 184, 136, 152, 232, 248, 200, 216
48, 32, 16, 0, 112, 96, 80, 64, 176, 160, 144, 128, 240, 224, 208, 192
56, 40, 24, 8, 120, 104, 88, 72, 184, 168, 152, 136, 248, 232, 216, 200
64, 80, 96, 112, 0, 16, 32, 48, 192, 208, 224, 240, 128, 144, 160, 176
72, 88, 104, 120, 8, 24, 40, 56, 200, 216, 232, 248, 136, 152, 168, 184
80, 64, 112, 96, 16, 0, 48, 32, 208, 192, 240, 224, 144, 128, 176, 160
88, 72, 120, 104, 24, 8, 56, 40, 216, 200, 248, 232, 152, 136, 184, 168
96, 112, 64, 80, 32, 48, 0, 16, 224, 240, 192, 208, 160, 176, 128, 144
104, 120, 72, 88, 40, 56, 8, 24, 232, 248, 200, 216, 168, 184, 136, 152
112, 96, 80, 64, 48, 32, 16, 0, 240, 224, 208, 192, 176, 160, 144, 128
120, 104, 88, 72, 56, 40, 24, 8, 248, 232, 216, 200, 184, 168, 152, 136

METHOD AND SYSTEM OF CONVOLUTIVE CODING FOR THE TRANSMISSION OF SPACE-TIME BLOCK CODES ACCORDING TO THE TECHNIQUE TERMED GOLDEN CODE

BACKGROUND

This invention relates to a method of convolutive coding for the transmission of space-time block codes according to the technique termed Golden Code. It also relates to a system implementing such a method.

In a general fashion, the invention is applicable to the field of transmission or radio broadcasting of digital data, or sampled analogue data, in particular in the case of transmission with mobiles or, in an even more general manner, in the case of local wireless networks or not. The invention can in particular, if it is wished, be applied to high data rate wireless transmissions. A first application category relates to cellular communication with mobiles, such as the UMTS, for example. A second application category relates to local wireless networks. A third category is that of future ad hoc networks.

In a more precise manner, this invention is applicable to multi-antenna MIMO ("Multiple Input Multiple Output") systems implementing space-time block codes of the Golden Code type.

A Space-Time Block Code (STBC) is a finite set $\Gamma$ of complex matrices (the codewords) having M lines and T columns and in which each component $\Gamma_{it}$ is the symbol which will be transmitted over the antenna i ($1 \leq i \leq M$) at the instant t ($1 \leq t \leq T$). An STBC is square if M=T.

The construction criteria for an STBC as described in particular in the document by V. Tarokh, N. Seshadri and A. R. Calderbank, "Space Time Codes for High Data Rates Wireless Communication: Performance Criterion and Code Construction", IEEE Transactions on Information Theory, vol. 44, no. 2, March 1998, are as follows:

The order of diversity (of transmission), marked d, of an STBC is defined by:

$$d = \underset{\substack{X,Y \in \Gamma \\ X \neq Y}}{\text{Min}} \text{rank}(X - Y)$$

An STBC is of full diversity if the order of diversity is maximum, i.e. d=Min (M, T).

The coding gain, marked g, of an STBC of full diversity with $T \geq M$ is defined by:

$$g = \underset{\substack{X,Y \in \Gamma \\ X \neq Y}}{\text{Min}} \sqrt[M]{\text{Det}((X - Y)(X - Y)^H)}$$

It has been demonstrated that the average error probability by codeword, on a Rayleigh fading channel, is proportional to $1/(g\text{SNR})^{dN}$ at high Signal to Noise Ratio. In order to maximise the performances of an STBC over this type of channel, it is therefore necessary to maximise the coding gain.

As indicated previously, this invention relates more particularly to a space-time block code of the Golden Code type.

The Golden Code, as defined in the document by J.-C. Belfiore, G. Rekaya and E. Viterbo, "The Golden Code: A 2×2 Full-Rate Space Time Code with Non-Vanishing Determinants", IEEE Transactions on Information Theory, vol. 44, no. 2, April 2005 is a square STBC with 2 transmit antennas (M=2 and T=2). This code is with full diversity (d=2). It offers the best coding gain as of today. This is the algebraic construction of the Golden Code which can carry out its partitioning.

In order to define the Golden Code, it is necessary to introduce division cyclic algebra (non-switching body), $A_Q$, constructed on the body $Q[i, \theta]$ in the following manner:

$$A_Q = \left\{ \begin{bmatrix} a + b \cdot \theta & c + d \cdot \theta \\ i(c + d \cdot \bar{\theta}) & a + b \cdot \bar{\theta} \end{bmatrix} \text{ with } a, b, c, d \in Q[i] \right\}$$

where $i^2 = -1, \theta$ $= \dfrac{1 + \sqrt{5}}{2}$ and $\bar{\theta} = \dfrac{1 - \sqrt{5}}{2}$ The ring, marked $A_Z$, is defined on this algebra while restricting a, b, c and d in the ring of Gauss integers Z[i]:

$$A_Z = \left\{ \begin{bmatrix} a + b \cdot \theta & c + d \cdot \theta \\ i(c + d \cdot \bar{\theta}) & a + b \cdot \bar{\theta} \end{bmatrix} \text{ with } a, b, c, d \in Z[i] \right\}$$

The infinite Golden Code, marked $\Gamma_\infty$, is a principal ideal of the ring $A_Z$ generated by an element a of this ring. It should be noted that if a vectorial instead of a matricial representation is chosen, $A_Z$ and therefore the Golden Code are real 8-dimensional lattices. The element a was chosen such that the ideal forms a lattice corresponding to $\sqrt{5}Z^8$. This is why the Golden Code includes a normalisation by $1/\sqrt{5}$. Accordingly:

$$\Gamma_\infty = \left\{ \dfrac{1}{\sqrt{5}} \alpha \begin{bmatrix} a + b \cdot \theta & c + d \cdot \theta \\ i(c + d \cdot \bar{\theta}) & a + b \cdot \bar{\theta} \end{bmatrix} \text{ with } a, b, c, d \in Z[i] \right\}$$

where $$\alpha = \begin{bmatrix} 1 + i - i \cdot \theta & 0 \\ 0 & 1 + i - i \cdot \bar{\theta} \end{bmatrix}$$

It has been shown that the infinite Golden Code coding gain is $1/\sqrt{5}$. If a finite code is used, it suffices to constrain a, b, c and d to belong to a finite sub-set included in Z[i] (a QAM constellation for example). The fact that the infinite Golden Code corresponds to $Z^8$ greatly facilitates binary labelling and "shaping" (the fact of extracting a constellation) while guaranteeing a good Euclidean distance between codewords.

SUMMARY

The purpose of this invention is a novel method for improving the coding gain of a space-time block code of the Golden Code type.

Another purpose of this invention is an information coding system which is particularly efficient in the case of a fading channel.

At least one of the aforementioned objectives is achieved with a method of convolutive coding for the transmission of space-time block codes according to the technique termed Golden Code, in a wireless communication network comprising at least a plurality of transmit antennas. According to the invention, the Golden Code coding is associated with a trellis coded modulation TCM. Moreover, the partitioning necessary to said trellis is carried out such that, for each step of partitioning, a set $\Gamma_\infty$ is multiplied by at least one element $\beta$ from the set $B_k$ (k>1) of elements of Az such that:

$$B_k = \{X \in Az \text{ and } |Det(X)|^2 = 2^k\},$$

the set $\Gamma_\infty$ termed "infinite Golden Code" being a principal ideal of the ring Az as defined by the Golden Code technique.

With this invention, a modulation technique coded with the Golden Code is advantageously used, and the technique of partitioning the Golden Code in order to obtain the coding gain is used.

In a general fashion, the coding gain of a sequence of STBC codewords can be defined in the manner which follows.

A sequence $(X_k)_{1 \leq k \leq n}$ of n words from the code STBC $\Gamma$ (M=2 and T>1) sent one after the other. It is always possible to consider this sequence as a single codeword from an STBC code (M=2 and nT) constituted by the concatenation of the n matrices $X_k$. In this case, a coding gain, marked $g_n$, for a sequence of length n:

$$g_n = \min_{\substack{(X_k) \neq (Y_k) \\ (X_k),(Y_k) \in \Gamma^n}} \sqrt[2]{Det \sum_{k=1}^{n} (X_k - Y_k)(X_k - Y_k)^H}$$

By putting $Z_k = (X_k - Y_k)$ and by modifying the indexing on $Z_k$ such that the first $n_0$ $Z_k$'s are all non zero and all the others zero, the following is obtained:

$$Det\left(\sum_{k=1}^{n} (X_k - Y_k)(X_k - Y_k)^H\right) = Det\left(\sum_{k=1}^{n_0} Z_k Z_k^H\right)$$

If it is assumed that the STBC $\Gamma$ is of maximum diversity and square (as is the case of the Golden Code), if $Z_k$ is not zero then $Z_k$ is inversible and one can define $\tilde{Z}_k = Det(Z_k) Z_k^{-1}$. It is then easily shown that:

$$Det\left(\sum_{k=1}^{n_0} Z_k Z_k^H\right) = \sum_{k=1}^{n_0} Det(Z_k Z_k^H) + \sum_{k=1}^{n_0} \sum_{j=k+1}^{n_0} \|\tilde{Z}_k Z_j\|_2^2$$

where $\|X\|_2$ designates the Frobenius standard (or standard 2) of the matrix X.

If the STBC code considered has an additive group structure (as with the Infinite Golden Code), the coding gain can be rewritten in the following manner:

$$g_n = \min_{1 \leq n_0 \leq n} \min_{\substack{Z_k \in \Gamma \\ Z_k \neq 0}} \sqrt[2]{\sum_{k=1}^{n_0} Det(Z_k Z_k^H) + \sum_{k=1}^{n_0} \sum_{j=k+1}^{n_0} \|\tilde{Z}_k Z_j\|_2^2}$$

The idea of coded modulations is to create a temporal link between the different STBC codewords sent during a sequence in order to increase the coding gain; this corresponds to the case where $n_0 > 2$. In this case, our particular interest is in the crossed terms $\|Z_k Z_j\|_2^2$ likely to increase the gain considerably. For the case $n_0 = 1$, one ensures that the sequences of code words which have only a single non-zero code word, let us say $Z_k$ are such that $Det(Z_k \tilde{Z}_k^H)$ is sufficiently high not to penalise the overall coding gain.

In order to do this, the Trellis Coded Modulation technique TCM is advantageously used. Just as in the case of a Gaussian channel marked AWGN, it is necessary to have a binary labelling which is based on a partitioning of the constellation sent.

In the context of TCM, a partitioning consists of finding from an additive starting group $E_0$ a decreasing sequence $(E_i)$ of sub-groups such that at each partition step the set quotient $E_i/E_{i+1}$ has a cardinal (the term used will be order) which is a power of 2 to allow binary labelling.

A good partitioning within the meaning of TCM must allow at the appropriate time a distance criterion within all the sub-sets. In the case of TCM over a Gaussian channel this is a Euclidean distance criterion with minimal squaring even though for an STBC this is the coding gain:

$$g(E_i) = \min_{\substack{X \in E_i \\ X \neq 0}} Det(XX^H)$$

For example, still in the context of TCM according to the prior art, FIG. 1 describes a partition chain of Z[i] corresponding to a QAM constellation in the case of the Gaussian channel (AWGN).

This partition chain can be continued for as long as this is necessary in order to label a point of a QAM constellation using bits $c_0$, $c_1$, etc. It is important to note that, at each partition level, the square of the Euclidean distance within each sub-set is twice that of the preceding level. Moreover, it will be noted that binary labelling has been made possible owing to the fact that this set is sub-divided into n sub-sets (the order) where n is a power of 2.

This invention is particularly applicable to ideal sets of the Golden Code, these sets being defined as follows.

If $\beta$ is a non-zero element of $A_2$ and such that $|Det(\beta)|^2 > 1$, the principal ideal to the left of $\Gamma_\infty$ generated by $\beta$, marked $\beta.\Gamma_\infty$, and the principal ideal to the right of $\Gamma_\infty$ generated by $\beta$, marked $\Gamma_\infty.\beta$, are defined by:

$$\beta \Gamma_\infty = \{\beta X | X \in \Gamma_\infty\}$$

$$\Gamma_\infty \beta = \{X\beta | X \in \Gamma_\infty\}$$

The ideals to the left and to the right can be distinct because of the non-commutativity of the algebra.

It is easy to demonstrate that these two principal ideals are additive sub-groups (or sub-lattices) of $\Gamma_\infty$ which have the following two properties:

The coding gain of each of the ideals equals:

$$g(\beta \Gamma_\infty) = g(\Gamma_\infty \beta) = |Det(\beta)| g(\Gamma_\infty) = \frac{|Det(\beta)|}{\sqrt{5}}$$

These ideals are of the order $|Det(\beta)|^4$ compared with $\Gamma_\infty$, i.e.:

$$Card(\Gamma_\infty/\beta\Gamma_\infty) = Card(\Gamma_\infty/\Gamma_\infty\beta) = |Det(\beta)|^4$$

Advantageously, in this invention, a partitioning of the Golden Code is carried out which is adapted to coded modulations.

As was mentioned previously, in order to use TCM, it is necessary to create a partitioning where, at each step of the partition, a step is sub-divided into a power of 2 sub-sets.

As $\beta$ is an element of $A_2$, the determinant of $\beta$ is in $Z[i]$. From this, it can be deduced that there is no $\beta$ such that the principal ideals generated by $\beta$ would be of order 2 compared with $\Gamma_\infty$ (or of an order which is an odd power of 2).

The invention is particularly remarkable by the fact that $\beta$'s are defined for which the order is a power of 4. One then advantageously introduces the sets $B_{k\,(k\geq 1)}$ of elements of $A_2$ such that their determinant would have for square modulus $2^k$:

$$B_k = \{X \in Az \text{ and } |Det(X)|^2 = 2^k\}$$

None of the $B_k$ is empty as $$\begin{bmatrix} i(1-\theta) & 1-\theta \\ i(1-\bar\theta) & i(1-\bar\theta) \end{bmatrix}^k$$

belongs to $B_k$. It should also be noted that all $B_k$ sets are infinite.

If $\beta_k$ is any element of $B_k$, the ideal $\beta_k \Gamma_\infty$ (or the ideal $\Gamma_\infty \beta_k$) constitutes a sub-lattice of order $4^k$ of $\Gamma_\infty$ and coding gain $\sqrt{2^k/5}$.

Thus, each of the elements of the set $\Gamma_\infty/\beta_k \Gamma_\infty$ can be indexed by 2 k bits. Using this method a first partition step is carried out which it is sufficient to reiterate in order to obtain as many partitions as necessary.

According to the invention, $\beta$ can be multiplied at $\Gamma_\infty$ by the left or by the right.

According to one preferred characteristic of the invention, one considers:

$$\beta = \begin{bmatrix} i(1-\theta) & i(2-\theta) \\ -(2-\bar\theta) & i(1-\bar\theta) \end{bmatrix},$$

$\beta$ is an element of $B_1$.

According to another characteristic of the invention, it is also possible to multiply the set $\Gamma_\infty$ by an element $\beta'$ such that:

$$\beta' = \begin{bmatrix} i\theta & -(1-\theta) \\ -i(1-\bar\theta) & i\bar\theta \end{bmatrix},$$

$\beta'$ is an element of $B_1$.

According to an advantageous embodiment of the invention, with k=1, a partitioning is carried out in four steps, using eight bits $c_0$ to $c_7$ in order to produce the convolutive coding, and these eight convolutive coding bits are coded from four information bits $b_0$ to $b_3$ such that:

$c_0 = c_1 = c_2 = 0$ $c_3 = xb_0 + x^2 b_1 + x^3 b_2 + x^4 b_3$ $c_4, c_5, c_6, c_7$ being equal respectively to one of the bits $b_0$ to $b_3$.

According to another aspect of the invention, a convolutive coding system is proposed for the transmission of space-time block codes according to the technique termed Golden Code, in a wireless communication network comprising at least a plurality of transmit antennas. According to the invention, the system comprises a convolutive coder receiving bits of information to be transmitted and generating a set of coded bits and a space-time block coder of the Golden Code type, these two coders being implemented such that the space-time block coder of the Golden Code type transmits sequences obeying the following conditions: a convolutive coding by trellis coded modulation TCM, and a partitioning necessary to said trellis such that, for each partitioning step, a set $\Gamma_\infty$ is multiplied by at least one element $\beta$ from the set $B_k$ (k>1) of elements of Az such that:

$$B_k = \{X \in Az \text{ and } |Det(X)|^2 = 2^k\},$$

the set $\Gamma_\infty$, termed "infinite Golden Code", being a principal ideal of the ring Az as defined by the Golden Code technique.

BRIEF DESCRIPTION OF THE DRAWINGS

Other advantages and characteristics of the invention will become apparent on examination of the detailed description of an embodiment which is in no way limitative, and the attached diagrams, in which.

Examples of the implementation of the method according to this invention will now be described in order to obtain a coding gain by using a coded modulation technique with a space-time block code with two transmit antennas.

Figure 1:
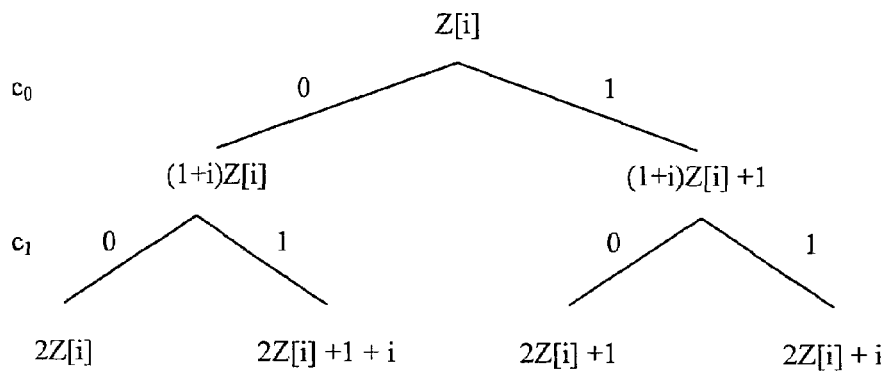
FIG. 1 describes a partitioning according to the prior art.
Figure 2:
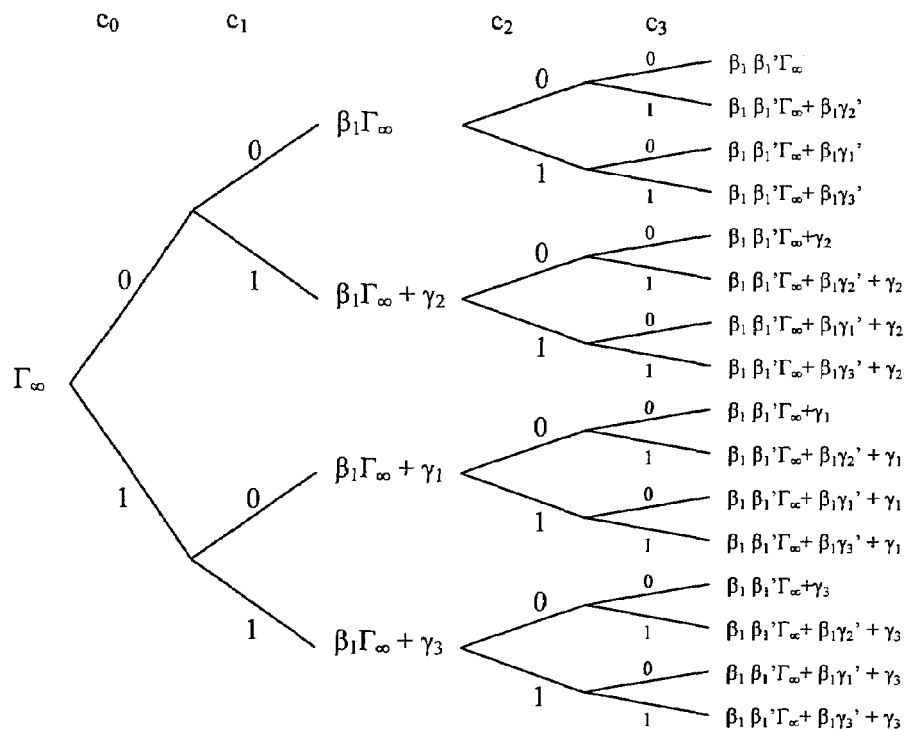
FIG. 2 describes a partitioning in two steps according to the invention.

FIG. 2 shows a partitioning according to this invention. By considering any two elements $\beta_1$ and $\beta_1'$ from $B_1$, it is possible to create a partitioning into 16 of $\Gamma_\infty$ in two partition steps. $B_1 = \{X \in Az \text{ and } |DetX|^2 = 2\}$.

DETAILED DESCRIPTION OF THE PREFERRED EMBODIMENT

By marking the 4 elements of the set $\Gamma_\infty/\beta_1 \Gamma_\infty$ (resp. $\Gamma_\infty/\beta_1'\Gamma_\infty$) $0, y_1, y_2$ and $y_3$ (resp. $0, y_1', y_2'$ and $y_3'$, which will be indexed by the bit doublet $(c_0, c_1)$ (resp. $(c_2, c_3)$), the partitioning can be represented as illustrated in FIG. 2. $\Gamma_\infty$ is the start point. The first partition makes it possible to generate four elements by multiplying $\beta_1$ to the left of $\Gamma_\infty$. One then obtains, $\beta_1 \Gamma_\infty$, $\beta_1 \Gamma_\infty + y_2$, $\beta_1 \Gamma_\infty + y_1$, and $\beta_1 \Gamma_\infty + y_3$. These four elements are coded with two convolutive coding bits $c_0$ and $c_1$.

The second partition consists of introducing $\beta_1'$ to the left of $\Gamma_\infty$ and of generating the following sixteen elements:

$[\beta_1\beta_1'\Gamma_\infty, \beta_1\beta_1'\Gamma_\infty + \beta_1\gamma_2', \beta_1\beta_1'\Gamma_\infty + \beta_1\gamma_1, \beta_1\beta_1'\Gamma_\infty + \beta_1\gamma_3']$;

$[\beta_1\beta_1'\Gamma_\infty + \gamma_2, \beta_1\beta_1'\Gamma_\infty + \beta_1\gamma_2' + \gamma_2, \beta_1\beta_1'\Gamma_\infty + \beta_1\gamma_1' + \gamma_2, \beta_1\beta_1'\Gamma_\infty + \beta_1\gamma_3' + \gamma_2]$;

$[\beta_1\beta_1'T_\infty+\gamma_1,\beta_1\beta_1'T_\infty+\beta_1\gamma_2'+\gamma_1,\beta_1\beta_1'T_\infty+\beta_1\gamma_1'+\gamma_1,\beta_1\beta_1'T_\infty+\beta_1\gamma_3'+\gamma_1]$ $[\beta_1\beta_1'T_\infty+\gamma_3,\beta_1\beta_1'\gamma\infty+\beta_1\gamma_2'+\gamma_3,\beta_1\beta_1'T_\infty+\beta_1\gamma_1'+\gamma_3,\beta_1\beta_1'T_\infty+\beta_1\gamma_3'+\gamma_3]$.

These sixteen elements are coded with two convolutive coding bits $c_2$ and $c_3$ in combination with the bits $c_0$ and $c_1$.

Figure 3:
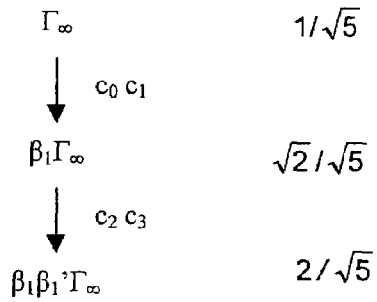
FIG. 3 is a complete representation of the partitioning of FIG. 2.

This partitioning can be represented in a more compact manner as illustrated in FIG. 3. The coding gains are represented to the right of each partition. By the Golden Code principle, the gain is $1/\sqrt{5}$ for $\Gamma_\infty$. The first partition shows a coding gain of $\sqrt{2}/\sqrt{5}$. The third partition shows a coding gain of $2/\sqrt{5}$. The gain has thus been multiplied by two with a limited complexity.

Therefore, by using generators in $B_1$, it is guaranteed that the coding gain will be multiplied by a factor of $\sqrt{2}$ (1.5 dB) every 2 partition bits.

The choice of elements of $B_1$ used and the choice of placing the ideal to the left or to the right does not affect the coding gains along the partitioning. On the contrary, these choices influence the gain in crossed terms if $n_0>1$ and the Euclidean distance criterion (in the case where the code is used over a Gaussian channel). A complete example of construction of a trellis coded modulation applied to a Golden Code will now be described.

Figure 4:
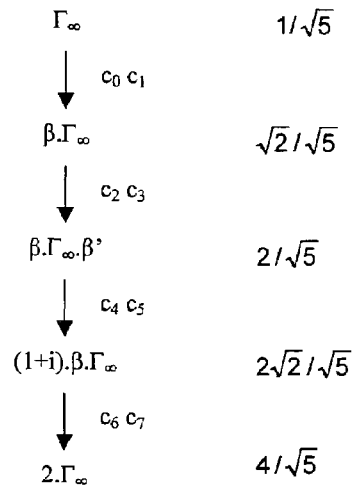
FIG. 4 is a compact representation of an example of partitioning in four steps according to the invention.

By choosing $\beta = \begin{bmatrix} i(1-\theta) & i(2-\theta) \\ -(2-\bar\theta) & i(1-\bar\theta) \end{bmatrix}$ and $\beta' = \begin{bmatrix} i\theta & -(1-\theta) \\ -i(1-\bar\theta) & i\bar\theta \end{bmatrix}$ and $\beta'$ are elements of $B_1$), a partitioning in 4 steps of the Golden Code is constructed as illustrated in FIG. 4.

If any non-zero sequence $(Z_k)$ verifies the following conditions:

$n_0=1$, then the only non-zero codeword sent belongs to $2.\Gamma_\infty$.

$n_0>1$, then at least one of the codewords marked $Z_1$ belongs to $\beta.\Gamma_\infty$ and the other marked $Z_2$ belongs to $\beta.\Gamma_\infty.\beta'$.

This demonstrates that the coding gain is 4 (6 dB) with respect to the Golden Code.

In order to construct a sequence which verifies the conditions mentioned previously, a bit coding $c_0, c_1 \ldots c_7$ is used, with a convolutive coding which is described by a trellis (the other bits, the number of which depends on the QAM constellation chosen being uncoded). There are a number of trellises making it possible to construct a sequence verifying these conditions. In particular, the number of transitions per trellis state, which will determine the code efficiency, will influence the complexity of the trellis considerably.

Figure 5:
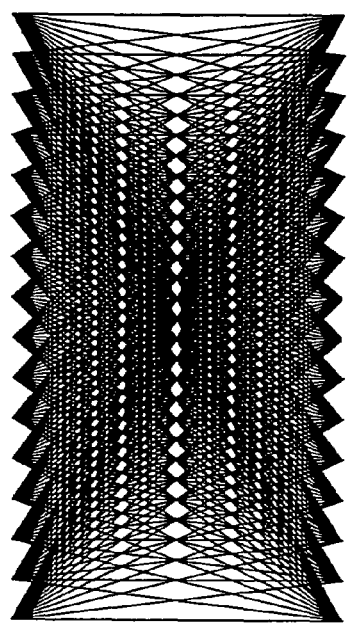
FIG. 5 illustrates a trellis example for the implementation of the method according to this invention.

A solution is described here which introduces a trellis somewhat less complex, with 16 states and 16 transitions per state. This gives a yield efficiency of ½. FIG. 5 shows such a trellis. For each state, the transitions which correspond to the sequence of bits $c_0, c_1 \ldots c_7$, represented in the form of an integer from 0 to 255 ($c_0$ being the least significant bit), are listed from top to bottom.

In reality, the bits $c_0$, $c_1$ and $c_2$ are set to 0. By marking the 4 information bits $b_0 \ldots b_3$, a systematic version of the convolutive coder can be given in the form:

$c_0=c_1=c_2=0$ $c_3=xb_0+x^2b_1+x^3b_2+x^4b_3$ $c_4=b_0$ $c_5=b_1$ $c_6=b_2$ $c_7=b_3$

Figure 6:
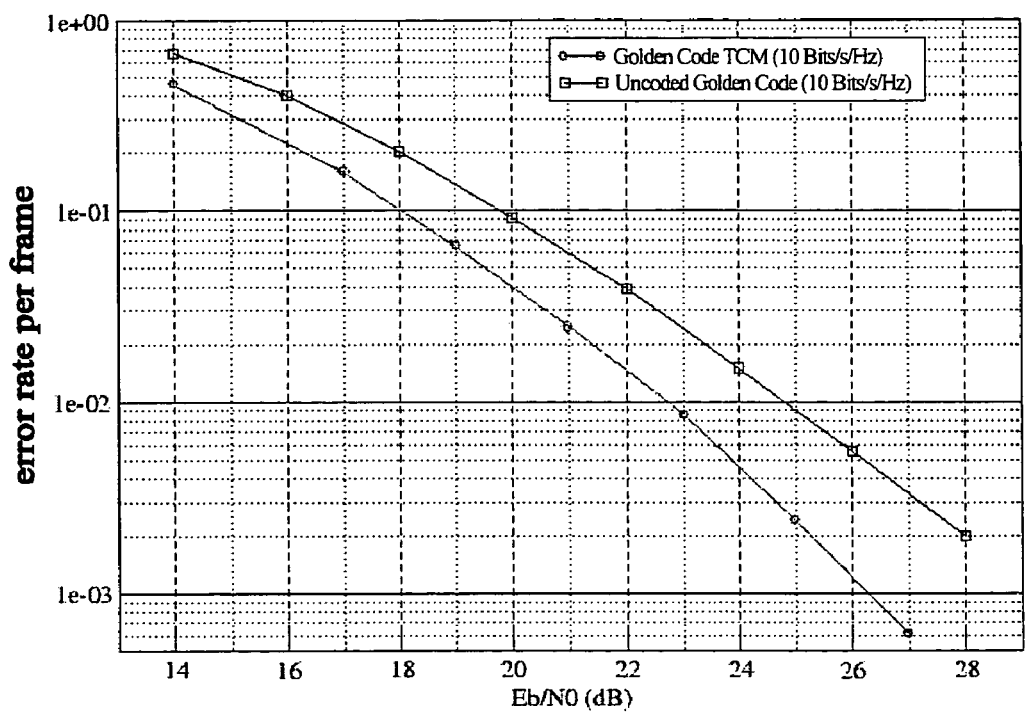
FIG. 6 is a comparative graphic representation between an uncoded Golden Code and a Golden Code coded by modulation.

It being given that four redundancy bits are introduced by the convolutive coding, the performance gain is 3 dB between an uncoded Golden Code and this Golden Code coded by modulation if the comparison is carried out at equal spectral efficiency in accordance with FIG. 6.

Figure 7:
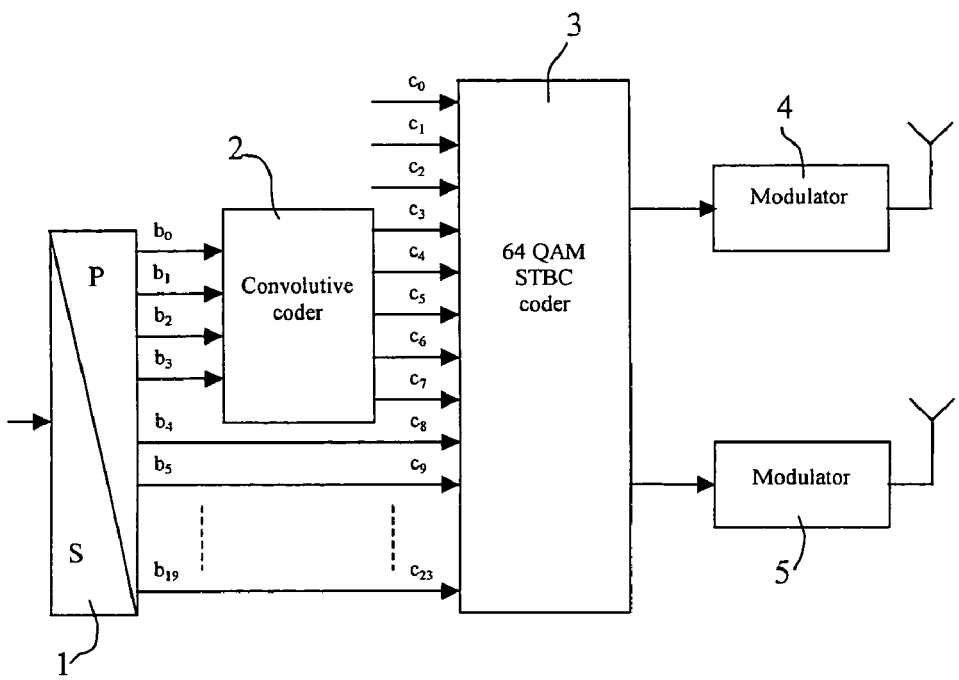
FIG. 7 is a diagrammatic view of an transmitter system according to the invention.

An implementation example of a transmitter according to the invention will now be described with respect to FIG. 7. This considers a Golden Code with 64 QAM symbols. As an STBC codeword is constituted by 4 64-QAM symbols, it is labelled over 24 bits, $c_0, c_1 \ldots c_{23}$. The bits $c_0 \ldots c_7$ are bits coded by the convolutive code according to the invention from the 4 information bits $b_0 \ldots b_3$. The bits $c_8 \ldots c_{23}$ are themselves information bits directly. The series-parallel converter 1 transmits the information bits $b_0 \ldots b_3$ to the convolutive coder 2 according to the invention, and the information bits $b_4 \ldots b_{19}$ directly to the STBC-Golden Code coder 3.

The STBC coder 3 provides to the two modulators 4 and 5 with a Golden Code 64 QAM codeword from the bits $c_0, c_1 \ldots c_{23}$ by respecting the binary labelling defined by the partitioning of the code. It should be noted that the partitioning does not necessarily have to be extended up to $c_{23}$ as, from $c_8$ conventional labelling over a 16 QAM can be used.

Of course the invention is not limited to the examples which have just been described and numerous adjustments can be made to these examples without exceeding the scope of the invention.

The invention claimed is:

1. A method of convolutive coding for the transmission of space-time block codes according to the technique termed Golden Code, the transmission being provided over a wireless communication network including at least a plurality of transmit antennas, comprising:

producing a necessary partition of a trellis coded modulation TCM using a coder for coding the Golden Code, such that, for each partitioning step, a set $\Gamma_\infty$ is multiplied by at least one element $\beta$ from the set $B_k$ (k>1) of elements of Az such that:

$B_k=\{X \in Az \text{ and } |Det(X)|^2=2^k\}$, wherein the set $\Gamma_\infty$ termed "infinite Golden Code" is a principal ideal of the ring Az as defined by the Golden Code technique.

2. The method of claim 1, wherein $\beta$ is multiplied to the left of $\Gamma_\infty$.

3. The method of claim 1, wherein $\beta$ is multiplied to the right of $\Gamma_\infty$.

4. The method of claim 1, wherein each component of a partition thus created is indexed by 2 k bits of convolutive coding.

5. The method of claim 1, wherein when:

$$\beta = \begin{bmatrix} i(1-\theta) & i(2-\theta) \\ -(2-\bar\theta) & i(1-\bar\theta) \end{bmatrix}$$

is considered, $\beta$ is an element of $B_1$.

6. The method of claim 1, wherein the set $\Gamma_\infty$ is multiplied by an element $\beta'$ such that:

$$\beta' = \begin{bmatrix} i\theta & -(1-\overline{\theta}) \\ -i(1-\overline{\theta}) & i\overline{\theta} \end{bmatrix},$$

where $\beta'$ an element of $B_1$.

7. The method of claim 1, with k=1, wherein when a partitioning in four steps is carried out, eight bits $c_0$ to $c_7$ are used to carry out the convolutive coding, and these convolutive coding bits are coded from four information bits $b_0$ to $b_3$ such that:

$$c_0 = c_1 = c_2 = 0$$

$$c_3 = xb_0 + x^2 b_1 + x^3 b_2 + x^4 b_3$$

$c_4$, $c_5$, $c_6$ and $c_7$ being respectively equal to one of the bits $b_0$ to $b_3$.

8. A system of convolutive coding for the implementation of a method according to claim 1, for the transmission of space-time block codes according to the technique termed Golden Code, in a wireless communication network comprising at least a plurality of transmit antennas; further comprising a convolutive coder receiving information bits to be transmitted and generating a set of coded bits, a space-time block coder of the Golden Code type, these two coders being implemented such that the space-time block coder of the Golden Code type transmits sequences obeying the following conditions: a convolutive coding by trellis coded modulation TCM, and a partitioning necessary to said trellis such that, for each partitioning step, a set $\Gamma_\infty$ is multiplied by at least one element $\beta$ from the set $B_k$ (k>1) of elements from $Az$ such that:

$$B_k = \{X \in Az \text{ and } |Det(X)|^2 = 2^k\},$$

the set $\Gamma_\infty$, termed "infinite Golden Code", being a principal ideal of the ring $Az$ as defined by the Golden Code technique.

9. A system for transmitting coded bits, comprising:
a wireless communication network including at least a plurality of transmit antennas;
a convolutive coder configured for receiving a set of non-coded bits, generating a set of coded bits, and transmitting said set of coded bits across the wireless communication network; and
a space-time block coder of a Golden Code type, which converts said set of non-coded bits to said set of coded bits by producing a necessary partition of a trellis coded modulation TCM, such that, for each partitioning step, a set $\Gamma_\infty$ is multiplied by at least one element $\beta$ from the set $B_k$ (k>1) of elements of $Az$ such that:

$$B_k = \{X \in Az \text{ and } |Det(X)|^2 = 2^k\},$$

wherein the set $\Gamma_\infty$ termed "infinite Golden Code" is a principal ideal of the ring $Az$ as defined by the Golden Code technique.

\* \* \* \* \*